Patented July 24, 1951

2,562,122

UNITED STATES PATENT OFFICE 2,562,122

PREPARATION OF URANIUM BROMIDE

Jack E. Powell, Ames, Iowa, assignor to the United States of America as represented by the United States Atomic Energy Commission No Drawing. Application May 1, 1946, Serial No. 666,531

8 Claims. (Cl. 23—14.5)

This invention is concerned with the production of uranium-bromine compounds such as $UBr_4$ or $UOBr_2$. It is frequently advantageous to produce a compound such as $UBr_4$ from a source material such as the uranium oxide, $UO_2$. This is advantageous for the reason that $UO_2$ may be prepared in a relatively pure form and therefore production of the uranium-bromine compounds in a relatively pure state is simplified. The problem of preparing uranium tetrabromide from $UO_2$ is complicated, however, since bromine does not react readily with $UO_2$.

In accordance with the present invention it has been found that the compounds $UBr_4$ and $UOBr_2$ may be prepared by reacting the compound $UO_2 \cdot 2US_2$ with a brominating agent such as bromine. Since $UO_2 \cdot 2US_2$ may be prepared conveniently by reacting $UO_2$ with carbon disulphide the present invention provides a convenient process whereby uranium tetrabromide may be prepared from $UO_2$ in a simple manner.

The accomplishment of the foregoing and the production of the novel compositions formed in the above described process constitute some of the principal objects of the invention. Other objects will become apparent by reference to the following more detailed disclosure.

As herein contemplated, the production of $UBr_4$ from $UOBr_2$ may be accomplished in a series of stages. Thus the uranium oxide may be reacted with carbon disulphide in accordance with the following equation:

(1) $\quad 3UO_2 + 2CS_2 \rightarrow U_3O_2S_4 + 2CO_2$

The above reaction may be conducted by heating $UO_2$ or $U_3O_8$ to a temperature of about 800 to 1000° C. or above and passing over the oxide or through it a mixture of gaseous carbon disulphide and nitrogen. The resulting compound $UO_2 \cdot 2US_2$ is a solid and remains in the reactor while the carbon dioxide which is evolved is removed.

Following preparation of the uranium oxide-uranium sulphide compound above-mentioned, this compound may be brominated by suitable methods such as by passing gaseous bromine through or over a bed or layer of the $UO_2 \cdot 2US_2$. It is found advantageous to conduct this reaction in the substantial absence of air and the reaction proceeds apparently in accordance with the following equation:

(2) $\quad U_3O_2S_4 + 6Br_2 \rightarrow UBr_4 + 2UOBr_2 + 2S_2Br_2$

This bromination reaction may be conducted in any suitable inert reactor which is capable of resisting the action of bromine or the various reaction products. When the process is conducted on a small scale, quartz reactors are suitable. The reactor should be provided with a suitable condenser system, usually air-cooled, adequate inlets for introduction of the brominating agents and outlets for conduction of the evolved gases through the condenser system. Adequate means for heating the reactor to the required temperature should also be provided.

The bromination described above may be conducted at an elevated temperature, usually above about 200° C. When the process is conducted at temperatures below about 600° C., uranium tetrabromide is formed in solid state and largely remains in the reactor, only slight amounts subliming and being collected in the condenser system. In such a case it is generaly advantageous to raise the temperature of the reactor after bromination is substantially completed, to a temperature above about 600° C. whereby the $UBr_4$ formed sublimes and is collected in the condenser. When this subliming process is conducted at a temperature of about 600 to 700° C. the compound $UOBR_2$ remains behind. This compound (uranous oxybromide) is generally in the form of greenish yellow needles or a fine yellow to tan powder. It is relatively air stable and nonhygroscopic and dissolves readily in water to give a clear green solution which darkens gradually upon standing.

The uranous oxybromide may be disproportionated into $UO_2$ and $UBr_4$ approximately in accordance with the following equation:

(3) $\quad 2UOBr_2 \rightarrow UBr_4 + UO_2$

This process may be effected by heating the $UOBr_2$ at a temperature of 800 to 1000° C. or above but below the decomposition temperature of $UBr_4$. In such a case the $UBr_4$ sublimes and is collected in the condenser while the uranium oxide remains behind. This residue of $UO_2$ may be recycled for the formation of further uranium-bromine compounds in accordance with the above-described process.

The process is capable of a number of variations. For example, the bromination of $UO_2 \cdot 2US_2$ and the decomposition of the resultant $UOBr_2$ may be conducted simultaneously by conducting the bromination at a temperature above about 800° C. and in such a case the resulting $UBr_4$ is sublimed and collected in a suitable condenser system. Alternatively, all of the reactions represented by the above equations (1), (2), and (3) may be conducted simultaneously if desired by placing $UO_2$ or $U_3O_8$ in a reactor heated to 800 to 1000° C. or above (but below the temperature of decomposition of the resulting $UBr_4$) and passing carbon disulphide and bromine, usually through separate inlets, through the bed of uranium oxide. By this process the uranium bromide will be formed directly and sublimed away and condensed by conventional means. Moreover, although bromine is found to be the most effective brominating agent for this purpose other brominating agents such as HBr may be used.

The following example is illustrative:

*Example 1*

A quantity of $UO_2$ which had been previously purified and is substantially free from impurities was placed in a quartz reactor in a furnace and the reactor was provided with an inlet for introducing carbon disulphide into the bed of $UO_2$. The reactor was also provided with an outlet connected to an air-cooled condenser system for collecting $UBr_4$ which was to be formed. A carbon disulphide-nitrogen gaseous mixture was passed through the uranium oxide bed while heating the oxide to approximately 800 to 1000° C. and the reaction was continued until carbon disulphide ceased to be taken up by the reaction mixture. Thereafter, the $UO_2 \cdot 2US_2$ obtained was heated to about 450° C. and a stream of bromide and nitrogen formed by bubbling nitrogen through liquid bromine was passed through the resulting bed of $UO_2 \cdot 2US_2$. Introduction of bromine was continued until formation of $S_2Br_2$ and distillation of this material from the reaction mixture ceased. Thereafter, the temperature of the reactor was raised to about 650 to 700° C. and $UBr_4$ distilled from the mass. This $UBr_4$ was collected in the condenser. When distillation of $UBr_4$ ceased the temperature of the reaction mixture in the reactor was raised to about 800 to 1000° C. whereupon further $UBr_4$ sublimed from the mixture due to decomposition of the uranous oxybromide. This heating was continued until no further amount of $UBr_4$ was sublimed. The remaining uranium oxide ($UO_2$) was left in the reactor and used with further additional quantities of uranium oxide to produce an additional amount of uranium tetrabromide. The above-described process may also be conducted using $U_3O_8$ in lieu of $UO_2$.

Although the present invention has been described with reference to the specific details of certain embodiments thereof, it is not intended that such details shall be regarded as limitations upon the scope of the invention except as included in the accompanying claims.

What is claimed is:

1. A method of preparing $UBr_4$ which comprises heating $UOBr_2$ above about 700° C., distilling $UBr_4$ therefrom and collecting the $UBr_4$.

2. A method of preparing a mixture of $UBr_4$ and $UOBr_2$ which comprises reacting $UO_2$ with $CS_2$ and a brominating agent to form $CO_2$, a volatile sulfur-containing material, and a mixture of $UBr_4$ and $UOBr_2$, and removing said $CO_2$ and said volatile sulfur-containing material from the mixture of $UBr_4$ and $UOBr_2$.

3. A method of preparing $UBr_4$ which comprises reacting $UO_2$ with $CS_2$ and a brominating agent at a temperature of at least 600° C., distilling $UBr_4$ therefrom, and collecting the $UBr_4$.

4. A method of preparing $UBr_4$ which comprises reacting $UO_2$ with $CS_2$ and a brominating agent at a temperature above about 800° C. distilling $UBr_4$ therefrom, and collecting the $UBr_4$.

5. A method of preparing a mixture of $UBr_4$ and $UOBr_2$ which comprises brominating $$UO_2 \cdot 2US_2$$

to form said mixture and a volatile sulfur-containing material, and removing said volatile material from the resultant mixture of $UBr_4$ and $UOBr_2$.

6. A method of preparing a mixture of $UBr_4$ and $UOBr_2$ which comprises reacting $UO_2$ with $CS_2$ to form $UO_2 \cdot 2US_2$, brominating said $UO_2 \cdot 2US_2$ to form a mixture of $UOBr_2$ and $UBr_4$ and a volatile sulfur-containing material, and removing said volatile material from the mixture of $UBr_4$ and $UOBr_2$.

7. A method of preparing $UBr_4$ which comprises reacting $UO_2$ with $CS_2$ to form $UO_2 \cdot 2US_2$, brominating said $UO_2 \cdot 2US_2$ to form a mixture of $UBr_4$ and $UOBr_2$ and a volatile sulfur-containing material, removing said volatile material from said mixture of $UBr_4$ and $UOBr_2$, heating said mixture to a temperature of above 700° C., distilling $UBr_4$ therefrom, and collecting the $UBr_4$.

8. A method of preparing $UBr_4$ which comprises reacting $UO_2$ with $CS_2$ to form $UO_2 \cdot 2US_2$, brominating said $UO_2 \cdot 2US_2$ to form a volatile sulfur-containing material and a mixture of $UBr_4$ and $UOBr_2$, removing said volatile material from said mixture, heating the mixture of $UBr_4$ and $UOBr_2$ above about 700° C. to form $UBr_4$ and $UO_2$ from said $UOBr_4$, distilling $UBr_4$ therefrom, collecting the $UBr_4$, and recycling the $UO_2$ formed in said heating of the mixture of $UBr_4$ and $UOBr_2$.

JACK E. POWELL.

REFERENCES CITED

The following references are of record in the file of this patent:

Chem. Abstracts; vol. 14, 1920, page 690.

Friend: Textbook of Inorganic Chemistry; vol. 7, part 3, pages 295 and 298 (1926), Charles Griffin & Co., Ltd., London.

Mellor: "Comprehensive Treatise on Inorganic & Theoretical Chemistry"; vol. 12, pp. 92 and 95.

Alfred Benrath Z. Wiss Photochem. 16, 253–61 (1917); cf. C. A. 9, 1723.